United States Patent

Dorazio et al.

[11] Patent Number: 6,068,314
[45] Date of Patent: May 30, 2000

[54] WIRE RACK HANDLING TOOL

[76] Inventors: Gery Daniel Dorazio, 1334 Queens Rd., Charlotte, N.C. 28207; Lee Pagani, 2726 Carmel Rd., Charlotte, N.C. 28226

[21] Appl. No.: 09/313,332

[22] Filed: May 17, 1999

[51] Int. Cl.[7] .................................................. A47J 45/10
[52] U.S. Cl. ............................................. 294/9; 294/32
[58] Field of Search ................................. 294/2, 6, 7, 9, 294/10, 12, 13, 26, 27.1, 29, 32; D7/368, 669, 688, 690

[56] References Cited

U.S. PATENT DOCUMENTS

| | | | |
|---|---|---|---|
| 163,659 | 5/1875 | Hoyt | 294/10 X |
| D. 256,875 | 9/1980 | Slagle . | |
| D. 261,595 | 11/1981 | Yellia . | |
| D. 264,037 | 4/1982 | Johnson . | |
| D. 268,561 | 4/1983 | Risser . | |
| D. 345,285 | 3/1994 | Hull . | |
| D. 353,307 | 12/1994 | Cucchiara . | |
| D. 379,736 | 6/1997 | Simmons . | |
| 554,150 | 2/1896 | Smith . | |
| 864,046 | 8/1907 | Trainham | 294/29 X |
| 1,004,312 | 9/1911 | Totty . | |
| 1,177,205 | 3/1916 | Mullin | 294/29 X |
| 1,360,359 | 11/1920 | Beaudet | 294/2 |
| 1,587,350 | 2/1926 | Parke . | |
| 1,824,562 | 9/1931 | Muhlichen | 294/29 |
| 3,161,430 | 12/1964 | Wiman | 294/32 |
| 3,409,935 | 11/1968 | Wishnick | 294/27.1 |
| 4,117,825 | 10/1978 | Robertson | 294/32 X |
| 4,471,985 | 9/1984 | Mahoney . | |
| 5,346,268 | 9/1994 | Baker et al. | 294/9 |

FOREIGN PATENT DOCUMENTS

1133779 10/1982 Canada .

*Primary Examiner*—Johnny D. Cherry

[57] ABSTRACT

The wire rack handling tool of this invention has a handle, a hooking element, and a stabilizing component. The preferred embodiment is made of formed wire and therefore the entire tool is rigid. The hooking element is at the bottom of the handle stem and is advanced onto a wire rack while the stabilizing component extends further below the hooking element. As the hooking element is engaged onto a wire rack, the entire tool is allowed to rotate about the hooking element where it is attached to the rack and the stabilizing component comes to rest against the underside of the the rack across several of the rack's parallel rib wires. This pivoting action about the fulcrum in the hooking element provides the leverage for the stability and handling of the wire rack. The width of the stabilizing component provides rotational support and stability of the rack when it is being lifted. The hooking element provides planar stability by preventing any pivot points in the plane of the wire rack by virtue of the separation and engagement of the several hooks or width of the hooking element and the encompassing nature of the hooking element around the wire rack perimeter wire.

1 Claim, 7 Drawing Sheets

WIRE RACK HANDLING TOOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a hand tool for engaging and handling wire racks, particularly shelf-like racks such as those typically found in ovens.

Various design patents of tools and utensils used for pushing or pulling oven racks have been invented. Some of these include inventions found in U.S. Pat. Nos. D379,736, D256,875, D353,307, D345,285, D268,561, D267,620, and D261,595. In contrast to these cited patents the oven rack moving tool, U.S. Pat. No. D264,037, uses spaced hooks to engage the oven rack. This provides limited additional stability over the previous designs during the push or pull operations. All of these devices are limited to pushing or pulling of the oven rack. In addition, such devices accomplish no positive or secure engagement of the oven rack. The barbecue grill lifting tool, U.S. Pat. No. 4,471,985, uses leverage to lift a grill by wedging the head between two grill wires. The engaging element forces the concentration of all the grill wire weight onto two of the wires thereby providing the possibility of bending of these wires. By its several grooves the engaging element itself provides a very limited secure engagement of the grill wire.

The problem with the prior art just reviewed is that they were not designed to give a high degree of control over the oven rack during handling. Part of the reason for this problem is that an oven rack is large and bulky and the cited inventions do not address this characteristic. In addition, where no tool is used there is always the danger of burns. Even in the case of using oven mitts or pot holders, heat can sometimes penetrate the cloth and burn a person's hand or fingers. Fingers can also easily slip beyond or through pot holders and get burned on the wires of the oven rack.

The insufficient degree of control over the oven rack by current oven rack utensils and the safety concern for the possibility of burns are the problems that this wire rack handling tool invention intends to solve or mitigate. These problems manifest themselves by sliding of the tools during push or pull operation and insufficient or no lifting capability. This wire rack handling tool invention provides a high degree of control over the oven rack while at the same time keeping a person's hands away from said rack thereby reducing the possibility of burns.

BRIEF SUMMARY OF THE INVENTION

This invention is directed to an engaging tool for handling wire racks typically associated with ovens.

The object of the present invention is to provide an easily attachable tool for safer more secure handling of wire racks, which can be easily engaged and disengaged before and after handling. Accordingly, several advantages of the present invention are:

(a) to provide a tool that can be used to handle wire racks in such operations as push, pull, and lift
(b) to provide a tool that securely engages wire racks
(c) to provide a tool that is secure and stable when in use
(d) to provide a tool that keeps hands away from hot surfaces during the handling of wire racks
(e) comfortable to use
(f) easy to clean and maintain—durable.

The wire rack handling tool comprises a handle, a hooking element, and a front stabilizing component. The hooking element is at the bottom of the handle. Extending further beyond the hooking element is the stabilizing component. The stabilizing component provides for the proper leverage for using the said tool by being at a reasonable distance from the hooking mechanism.

The hooking element is advanced onto a wire rack where it engages the perimeter wire member of the rack. Once the hooking element is engaged onto a wire rack, the entire tool is allowed to rotate about the hooking element where it is attached to said rack and the stabilizing component comes to rest against the underside of the said rack across several of the rack's parallel rib wires. The hooking element provides the fulcrum point for the leverage between the hooking element and stabilizing component. The hooking element restricts movement to a pivoting action about the rack's perimeter wire from the force of weight thereby ensuring stability during handling of the wire rack. The hooking element also prevents any pivot points in the plane of the wire rack. This occurs by virtue of the separation and engagement of the several hooks or width making up the hooking element, in conjunction with the encompassing nature of the hooking element around one of the wire rack's cross members. The width of the stabilizing component provides rotational stability, with respect to the handle, and support of the rack when it is being lifted.

The preferred embodiment of the wire rack handling tool is of formed wire and therefore the entire tool is rigid.

The objects and advantages of this wire rack handling tool will become more apparent from a consideration of the ensuing description and drawings. The use of this tool results in the safer and easier handling of wire racks such as those found in ovens.

Reference Numerals in Drawings 10 cut away partial wire oven rack
11 stabilizing component
12 V-grooves
13 hooking element
14 bend for handle
15 handle attachment lengths
16 handle
17 oven rack perimeter wire
18 wire rack parallel rib wires Drawing FIGS. 1, 2, 3A, 3B, and 4 are the preferred embodiment of the wire rack handling tool invention. Drawing FIGS. 5, 6, 7, and 8 are views of alternative embodiments of the wire rack handling tool invention. Each of the alternative embodiment views shows variations that the wire rack handling tool can take.

DETAILED DESCRIPTION OF THE INVENTION

Figure 1:
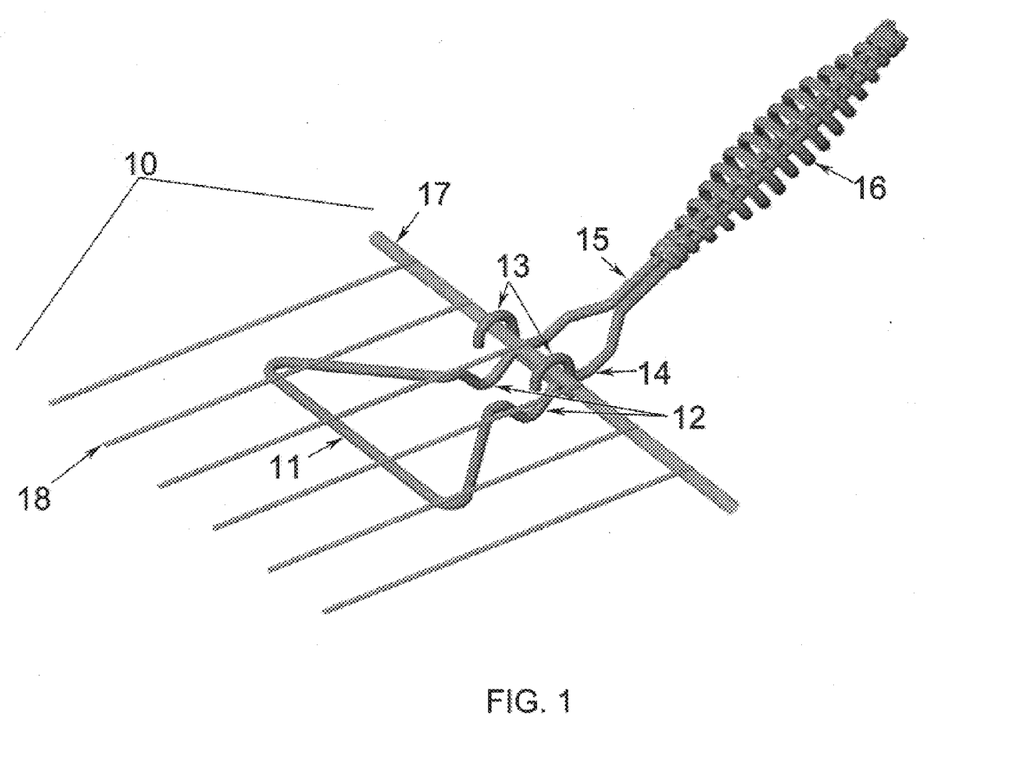
FIG. 1 is a perspective view of the wire rack handling tool of the invention used to engage and handle shelf-like wire racks such as those found in ovens. This figure includes a partial view of a wire rack being engaged.
Figure 2:
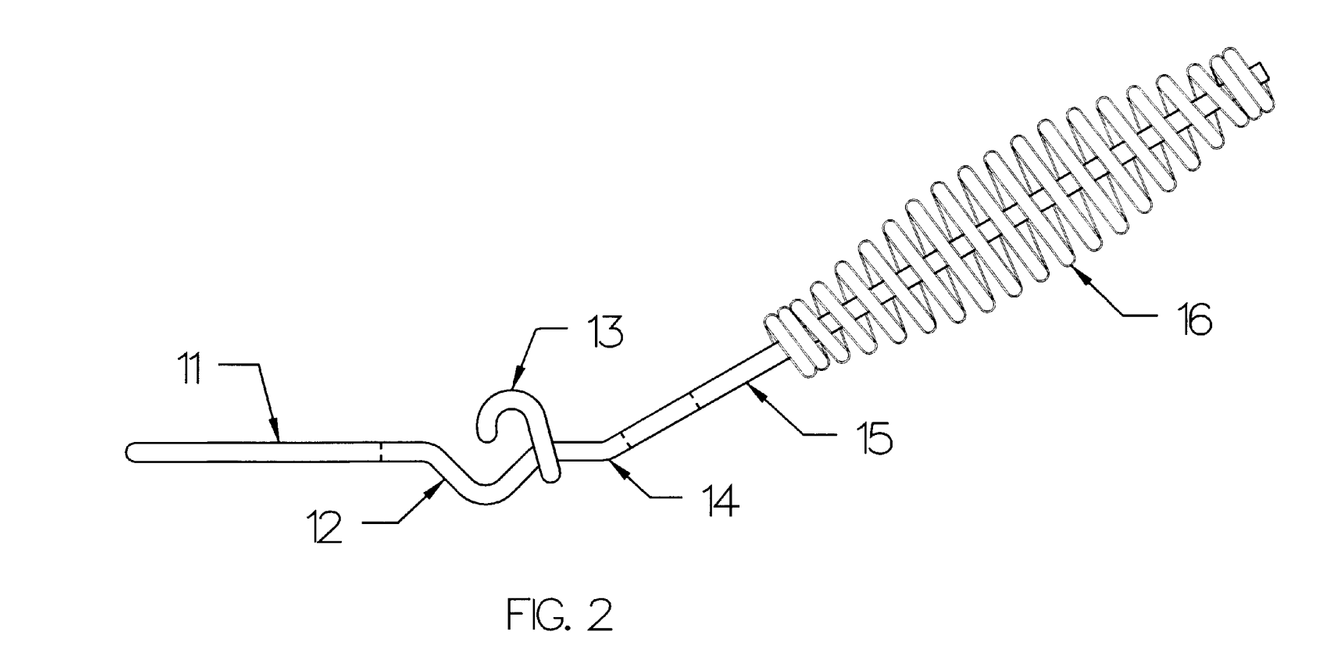
FIG. 2 is a side view of the wire rack handling tool of FIG. 1.
Figure 3A:
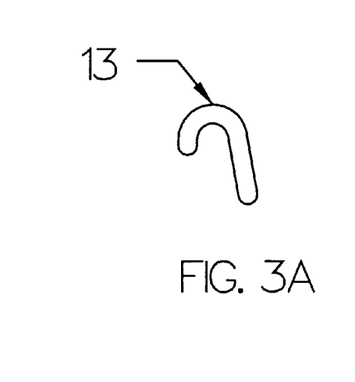
FIG. 3A is a side view of the hooking element of the wire rack handling tool.
Figure 3B:
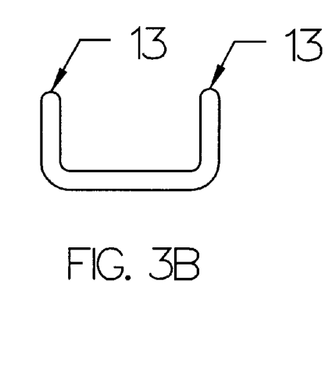
FIG. 3B is a rear view of the hooking element of the wire rack handling tool.
Figure 4:
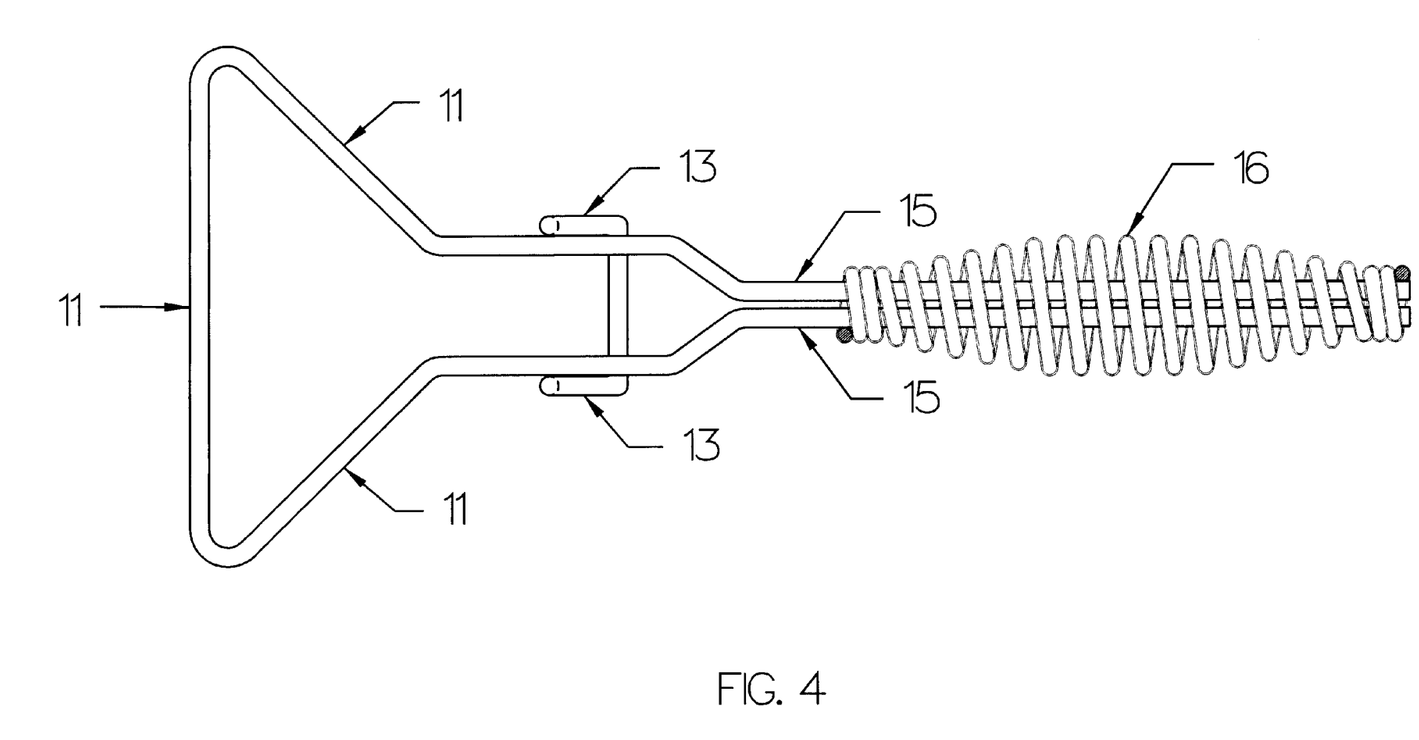
FIG. 4 is a top view of the wire rack handling tool of FIG. 1.
Figure 5:
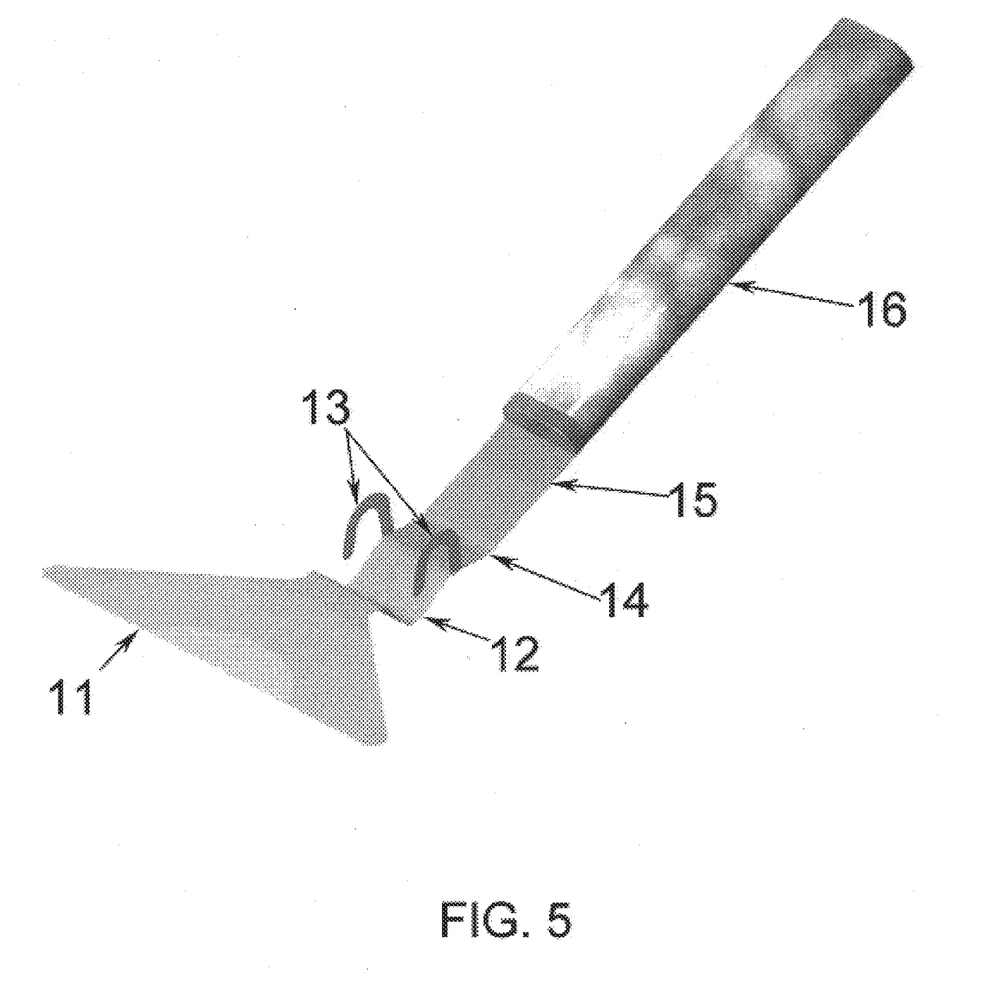
FIG. 5 is a perspective view of an alternate embodiment of the wire rack handling tool where the material used to fabricate the said tool is sheet metal.

A preferred embodiment of the wire rack handling tool of the present invention is illustrated in FIG. 1 (perspective view), FIG. 2 (side view), FIG. 3A (side view of hooking element), FIG. 3B (rear view of hooking element) and FIG. 4 (top view). The said tool is used to engage and handle shelf-like wire racks such as those typically found in ovens. The said tool is assembled from three parts. The 'base unit' part consists of a three-sided stabilizing component (11); V-grooves (12); and handle attachment lengths (15) which, at the bend for handle (14) location, are bent upward relative to the horizontal plane formed by the stabilizing component (11). The hooking element (13) and handle (16) parts are attached to the base unit at the locations shown.

Referring to FIG. 1, a wire rack handling tool is used to engage and handle shelf-like wire racks, such as those found in ovens. While holding the tool by the handle (16), a wire rack (10) is positively engaged by passing the wire rack's exposed perimeter wire (17) through the passages formed by the tool's V-grooves (12) and hooking element (13), and then guiding the tool to rest with the rack's perimeter wire (17) resting in the hooking element (13). This will automatically rotate the stabilizing component (11) to a position of engagement with the underside of the wire rack's (10) parallel rib wires (18). The wire rack (10) is now securely engaged, and can be pulled out, pushed in, or lifted. The design is such that positive engagement or disengagement (attaching or releasing the wire rack) requires a conscious tilting of the tool. This minimizes the possibility of unintended release.

During the act of lifting the oven rack with the said tool, the downward force of the weight of the rack is transferred to the said tool through the points of contact, namely at the hooking element (13) and the stabilizing component (11). The weight of the rack is transferred to the said tool's handle (16) whereby this transfer of support and control of the wire rack (10) goes from the oven rack support tracts to the tool, allowing for: lift and removal; raising/lowering to another support tract; and transport.

From these descriptions, a number of advantages of our wire rack handling tool become evident:

a) Hands remain at a safe distance from hot or greasy surfaces.

b) The said tool contacts a wire rack at multiple, separated support points at both the hooking element (13), and along the wide design of the stabilizing component (11). This separation of contact points counters the wire rack's (10) tendency to twist or tip when removed.

c) Based on industry standards for wire oven racks, the width of the stabilizing component (11) assures contact with at least 3 of the wire rack's parallel rib wires (18), spreading the weight to be supported over multiple rib wires.

The preferred embodiment of the wire rack handling tool is that it be constructed from round metal wire, bent and formed by a CNC machine into the shapes defined by the referred drawings. Some degree of hard tooling (dies) may be used. The size and material makeup of the wire is such that it can repeatedly lift and support shelf-like wire racks such as those typically found in ovens without bending or fracturing. In the preferred embodiment, the parts are constructed from stainless steel wire, and welded together using fixtures to assure correct and consistent positioning.

Figure 6:
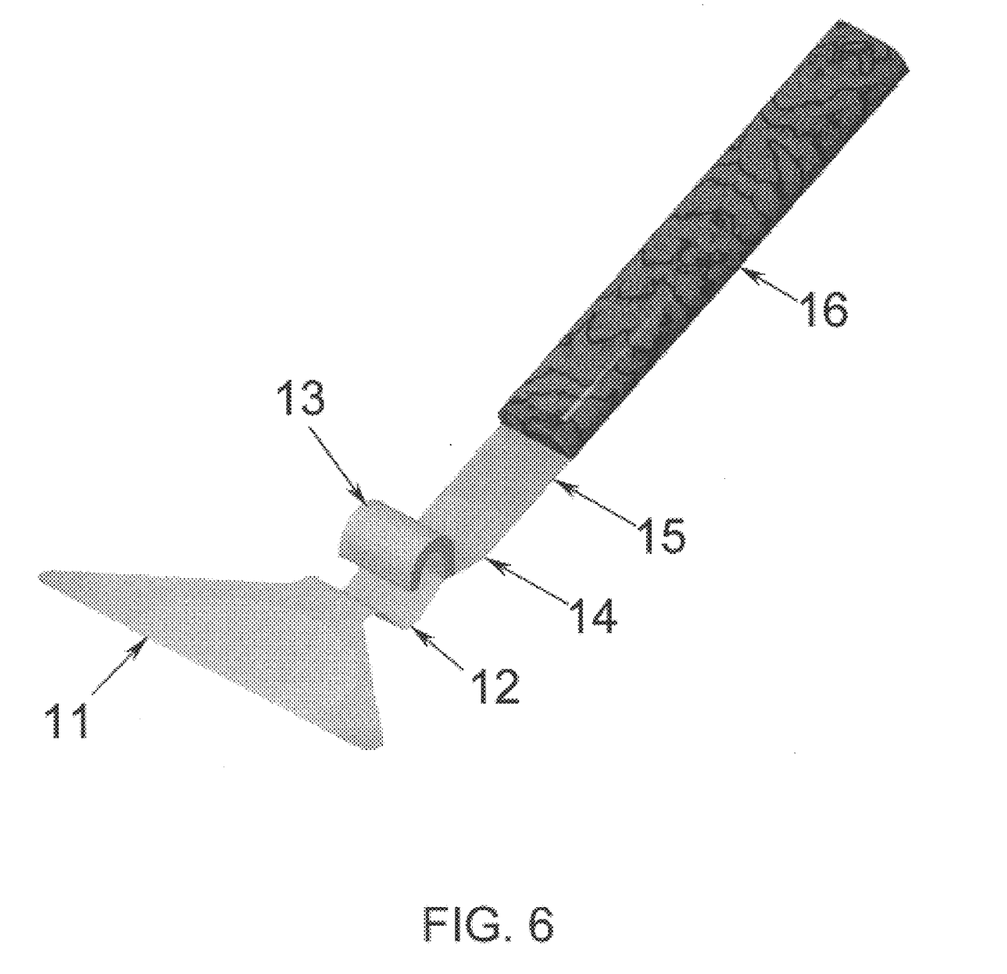
FIG. 6 is a perspective view of an alternate embodiment of the wire rack handling tool where the material used to fabricate the said tool is sheet metal and the hooking element is a solid half cylinder unit.
Figure 7:
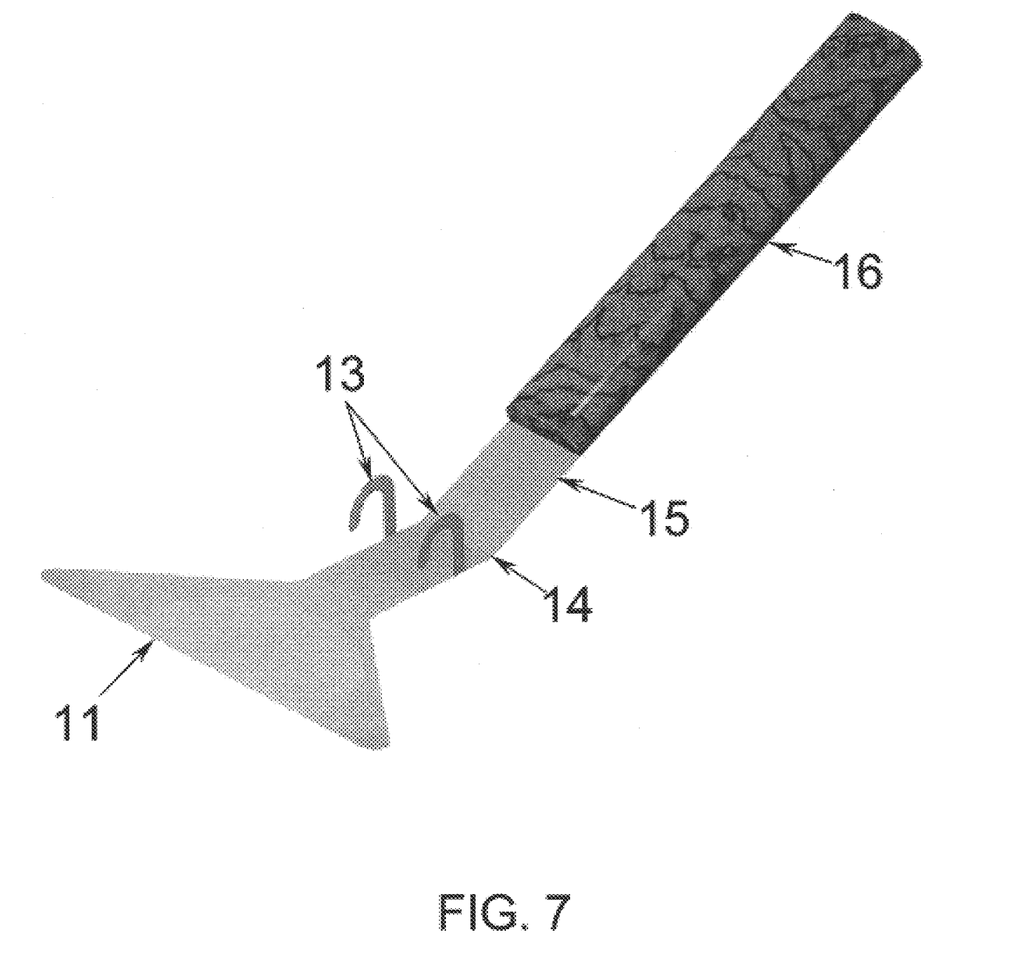
FIG. 7 is a perspective view of an alternate embodiment of the wire rack handling tool where the material used to fabricate the said tool is sheet metal and the V-groove is removed.
Figure 8:
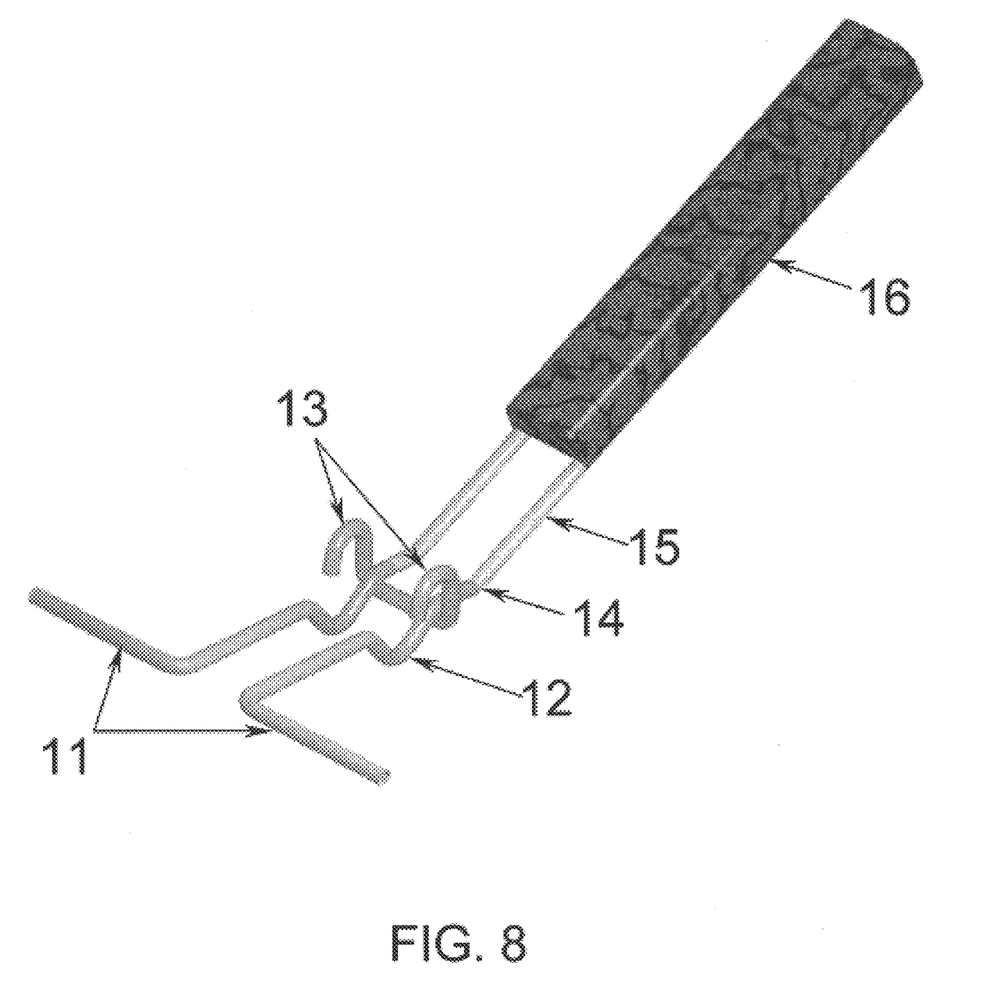
FIG. 8 is a perspective view of an alternate embodiment of the wire rack handling tool where the stabilizing component has a different shape.

Alternative embodiments of the wire rack handling tool are shown in FIGS. 5, 6, 7, and 8. Variations on the wire rack handling tool are shown in each of these figures. For instance, in FIG. 5, a different material is used to create the said tool; namely sheet metal instead of formed wire. The hooking element is also die pressed from the same sheet metal and bent into position. The handle can be of any appropriate material. In FIG. 6 the hooking element is a half moon shape thereby demonstrating the width in the hooking element in a different manner. A wide hooking element adds the needed stability for the wire rack handling tool. In FIG. 7 the V-grooves have been removed and are not required. When present, however, they serve to lower the point of the fulcrum in the hooking element thereby making the wire rack handling tool more compact. FIG. 8 shows the stabilizing component in a different wire form shape. The stabilizing component's main features are its width so as to encompass several of the wire rack's rib elements during use and its adequate distance from the hooking element so as to provide the necessary leverage for handling the wire rack.

While there has been shown and described a preferred embodiment of the wire rack handling tool of this invention, it is understood that changes in structure, materials, sizes, shapes, and method of manufacture can be made by those skilled in the art without departing from the invention. The invention is defined in the following claim.

We claim:

1. A tool for handling shelf-like wire racks having parallel cross member wires and a perimeter wire, said tool comprising:

(a) a hooking element having substantial width, or multiple hooks with substantial separation, for overlying engagement with said perimeter wire at multiple engagement points;

(b) a substantially planar stabilizing component that is at least wide enough to span and engage the underside of several cross member wires of said rack, said stabilizing component extending laterally from said hooking element and cooperating therewith by providing a countering force that stabilizes handling of said rack by virtue of the weight of said rack placing a force on said stabilizing component thereby causing a countering force to be applied into the hooking element, a free end of said hooking element being in or closely adjacent the plane of said stabilizing component; and (c) a handle attached to said stabilizing component adjacent said hooking element and extending upwardly from the plane thereof for engaging said hooking element onto said perimeter wire and positioning said stabilizing component underneath said cross member wires so as to induce a countering force which provides stabilization whereby said rack is stabilized during handling by both said hooking element and said stabilizing component.

* * * * *